(12) United States Patent
Bedros et al.

(10) Patent No.: US 8,948,467 B2
(45) Date of Patent: Feb. 3, 2015

(54) OCULAR AND IRIS PROCESSING SYSTEM AND METHOD

(75) Inventors: Saad J. Bedros, West St. Paul, MN (US); Kwong Wing Au, Bloomington, MN (US); Sharath Venkatesha, Golden Valley, MN (US); Rida M. Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 846 days.

(21) Appl. No.: 13/153,415

(22) Filed: Jun. 4, 2011

(65) Prior Publication Data

US 2012/0207357 A1  Aug. 16, 2012

Related U.S. Application Data

(60) Provisional application No. 61/371,617, filed on Aug. 6, 2010.

(51) Int. Cl.
*G06K 9/00* (2006.01)
*G06K 9/03* (2006.01)

(52) U.S. Cl.
CPC .......... *G06K 9/036* (2013.01); *G06K 9/00597* (2013.01)
USPC .......................................................... 382/117

(58) Field of Classification Search
CPC ................. G06K 9/00597; G06K 9/00617
USPC ........................................................ 382/117
See application file for complete search history.

(56) References Cited

U.S. PATENT DOCUMENTS

| | | | | |
|---|---|---|---|---|
| 6,714,665 | B1 * | 3/2004 | Hanna et al. | 382/117 |
| 7,593,550 | B2 * | 9/2009 | Hamza | 382/117 |
| 7,756,301 | B2 * | 7/2010 | Hamza | 382/117 |
| 8,064,647 | B2 * | 11/2011 | Bazakos et al. | 382/117 |
| 8,090,157 | B2 * | 1/2012 | Hamza et al. | 382/115 |
| 8,098,901 | B2 * | 1/2012 | Hamza | 382/117 |
| 8,280,119 | B2 * | 10/2012 | Hamza | 382/117 |
| 8,364,971 | B2 * | 1/2013 | Bell et al. | 713/186 |
| 8,411,910 | B2 * | 4/2013 | Savvides et al. | 382/117 |
| 8,442,339 | B2 * | 5/2013 | Martin et al. | 382/254 |
| 8,548,257 | B2 * | 10/2013 | Reid et al. | 382/224 |
| 2005/0270386 | A1 * | 12/2005 | Saitoh et al. | 348/239 |
| 2007/0274570 | A1 * | 11/2007 | Hamza | 382/117 |

OTHER PUBLICATIONS

Zhuoshi Wei, Tieniu Tan, Zhenan Sun and Jiali Cui, "Robust and Fast Assessment of Iris Image Quality" Advances in Biometrics Lecture Notes in Computer Science vol. 3832, 2005, pp. 464-471.*
Belcher, C.; Yingzi Du, "A Selective Feature Information Approach for Iris Image-Quality Measure," Information Forensics and Security, IEEE Transactions on , vol. 3, No. 3, pp. 572,577, Sep. 2008.*
European Application Serial No. 11168835.4, European Search Report mailed Aug. 19, 2014, 8 pgs.
Abhyankar, Aditya, et al., "Iris quality assessment and bi-orthogonal wavelet based encoding for recognition", *Pattern Recognition*, 42(9), (2009), 1878-1894.

(Continued)

*Primary Examiner* — Utpal Shah
(74) *Attorney, Agent, or Firm* — Schwegman Lundberg & Woessner, P.A.

(57) ABSTRACT

A condition based method that selects an appropriate approach among various iris and ocular image recognition algorithms for matching periocular images of a probe and target as a function of quality of images to obtain robust matching even under non-ideal acquisition scenarios.

20 Claims, 6 Drawing Sheets

(56) References Cited

OTHER PUBLICATIONS

Hollingsworth, Karen P., "Chapter 6—Periocular Biometrics", *In: Increased Use of Available Image Data Decreases Errors in Iris Biometrics*, Ph.D. Thesis, University of Notre Dame, (Jul. 2010), 136-154 (19 pgs.).

Nandakumar, Karthik, et al., "Quality-based Score Level Fusion in Multibiometric Systems", *18th International Conference on Pattern Recognition*, 2006, (ICPR '06), (Aug. 20, 2006), 4 pgs.

Park, Unsang, et al., "Periocular biometrics in the visible spectrum: A feasibility study", *IEEE 3rd International Conference on Biometrics: Theory, Applications, and Systems*, 2009, (BTAS '09), (Sep. 28, 2009), 1-6.

Woodard, Damon L. et al., "On the Fusion of Periocular and Iris Biometrics in Non-ideal Imagery", *20th International Conference on Pattern Recognition* (ICPR 2010), (Aug. 23, 2010), 201-204.

European Application Serial No. 11168835.4, Office Action mailed Nov. 11, 2014, 6 pgs.

\* cited by examiner

FIG. 1

| | BLUR OR SHARPNESS | OBSCURATION | GAZE |
|---|---|---|---|
| GLOBAL (OCULAR IMAGE) | CONTRAST TEXTURE ENERGY | PERCENTAGE OF IRIS AREA INSIDE THE EYELID | DISTANCE BETWEEN PUPIL CENTER TO CORNERS OF EYE |
| LOCAL (ENTIRE IRIS) | LOCAL CONTRAST LOG GABOR FREQUENCY | % OF IRIS AREA TO CIRCLE | FITNESS OF IRIS BOUNDARY TO CIRCLE |
| REGIONAL (IRIS PATCH) | LOCAL CONTRAST LOG GABOR FREQUENCY | % OF DARK PIXELS | LEFT, RIGHT IRIS WIDTHS |

FIG. 11

OCULAR AND IRIS PROCESSING SYSTEM AND METHOD

This application claims priority under 35 U.S.C. 119(e) to United States Provisional Patent Application No. 61/371,617 filed Aug. 6, 2010, which application is incorporated herein by reference and made a part hereof.

GOVERNMENT FUNDING

This invention was made with Government support under Grant Number W911NF-10-C-0027 awarded by USARMY RDECOM. The United States Government has certain rights in the invention.

BACKGROUND

Ocular recognition utilizes captured images of a periocular region of the eye, including the iris. Matching of the captured image to an image from a database is performed. It is well known that when a sharp iris image of a probe is captured and matched with a gallery of sharp iris of targets, excellent identification performance may be achieved. The captured images, however, may be acquired under non-ideal conditions and have varying quality. Such conditions may include non-cooperative moving subjects, varying eye gaze angles and obscured and out of focus iris resulting poor quality images. Matching a poor quality iris image often results in poor recognition performance.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, handheld device, or other type of processor operating on a computer system, such as a personal computer, server, including a SaaS (Software as a Service) where the processing occurs on a server cloud or other portable computation/communication systems.

Several different systems and methods for performing ocular and iris recognition are described based on a quality driven approach. Different mitigations are performed depending on the quality of images available for recognition.

Method for Quality-Based Iris Recognition

An iris image is affected by three factors: environmental conditions, the acquisition systems, and the sight and state of person of interest. As a result, an iris image could have diverse variations in spatial resolution, frequency resolution, and viewing aspects. Submitting an iris image with uncertain variation for matching often yields poor recognition performance. Existing applications iteratively acquire an iris image and determine the iris image's fitness for iris recognition. These applications work in a static system where the person of interest usually is stationary and at close range. In a dynamic environment, in which people are moving and the acquisition is at a distance, the acquired iris image may not have the high quality a conventional iris recognition system would like to have.

Nevertheless, the iris image needs to be matched against the targets in a gallery or database of images. In various embodiments an iris image is provided, whose quality can be good or bad. Iris recognition is performed by applying an appropriate iris recognition methodology based on the quality of the iris image.

The qualities of the provided iris image are first computed. These qualities can be grouped into ocular/periocular, iris and sub-iris qualities. Ocular/periocular quality measures the quality of the ocular/periocular region of the image. The iris qualities measure the qualities of the iris region; the sub-iris qualities measure the qualities of the different regions of the iris. The ocular/periocular, iris and sub-iris qualities are also referred as global, local and regional qualities respectively. The types of quality measures include, but are not limited to, sharpness or blur, the amount of occlusion, degree of gaze, and specular reflection. An overall quality measure, which is a combination of all these measures, may be defined in various embodiments. When reporting the iris recognition result, a match score is associated with a confidence value, which is derived from the overall quality measure, to provide a means of certainty to the recognition result.

In one embodiment, an iris recognition engine applies segmentation (separating an ocular image into components, including the iris), model fitting and iris map matching approaches according to the iris quality measures in a hierarchical manner. A sharp, frontal, no occlusion iris image is assumed to be the norm and may be processed utilizing a normal standard processing flow.

If an iris image is considered to be blurred as measured by a blur quality, it is treated separately. Adaptive multiband iris recognition may be invoked. Occlusion or glaze as indicated by their quality measures, are treated in region based approaches. For example, removal of noisy pixels can be performed based on histogram analysis for each iris sector (30/60 degrees) instead of analysis on the complete normalized iris map. Regions affected by shadows or thick eyebrows can be masked out. Sectors with more masked bits provide less confidence in the matching score. This can lead to having a weighted mask, instead of a binary mask. The method can be integrated in a standoff iris recognition system such as Honeywell's Combined Face and Iris Recognition System (CFAIRS).

Figure 1:
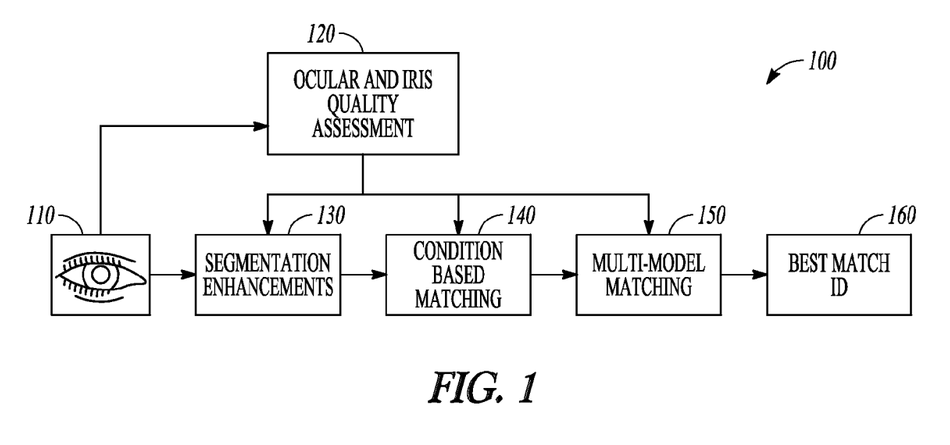
FIG. 1 is a block flow diagram of an iris recognition method utilizing image quality assessments to select matching methods according to an example embodiment.

A high level flow diagram of iris recognition methodology based on the quality of the iris image is illustrated generally at 100 in FIG. 1. An ocular image 110 is provided to a quality assessment algorithm 120, which computes the qualities of the iris image. The assessed qualities are then used to guide processing of the image utilizing segmentation enhancements 130, condition-based matching 140 and multi-model matching 150. A best matched identity 160 of the iris is obtained.

Segmentation enhancements in 130 refine the segmentation of the iris region from the input ocular image 110. A quality based segmentation procedure greatly improves the performance of iris recognition. The pupil segmentation is enhanced by using a multi-model approach, where the pupil is modeled as a generic circular arc, which simplifies to a circle or an ellipse in a normal condition. In case of an occluded pupil, only the part of the visible pupil is modeled. A curve fitting quality measure calculated here, defines the accuracy of pupil segmentation. The iris segmentation procedure depends on the above measure along with the computed blur quality measure.

The condition-based matching 140 models the enhanced segmented iris region with a proper iris fitting model based on the qualities of the iris. Different iris matching procedures are selected in matching irises of varying qualities. The matching procedures are quality based variations of a single iris matching algorithm eg. Honeywell POSE algorithm, or includes multiple iris matching algorithms. Then multi-model matching 150 if necessary, applies different fitting models to the segmented iris. These multiple models are derived from the qualities of the image and the model constraints.

Figure 2:
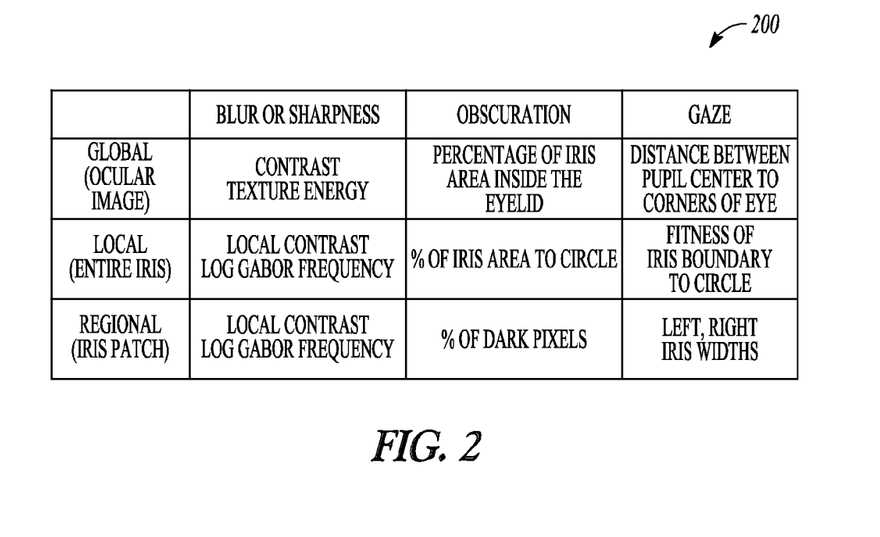
FIG. 2 is a table illustrating different quality metrics of iris images according to an example embodiment.

Multiple ocular and iris quality measurements are computed at 120. A table 200 in FIG. 2 shows examples of the quality measures. When reporting the iris recognition result or match identity 160, a match score and a confidence measure are associated with the image quality. These provide a means of certainty to the recognition result. Using large iris databases, the distributions of these iris qualities can be empirically computed. These distributions are stored and later used for categorizing the conditions of input iris probe for quality-based recognition.

Figure 3:
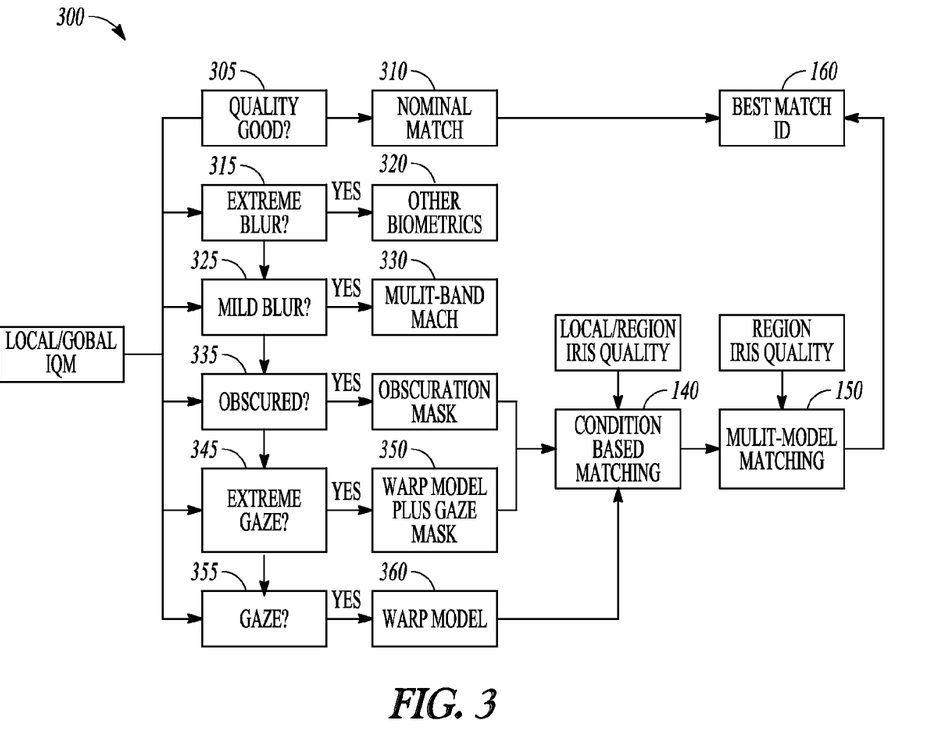
FIG. 3 is a detailed block flow diagram of a quality based iris recognition process according to an example embodiment.

FIG. 3 illustrates a more detailed flow diagram of a quality based iris recognition method. An iris recognition engine 300 applies the segmentation, model fitting and iris map matching approaches according to the iris quality measures in a hierarchical manner in one embodiment. A focused, sharp, frontal, open iris image yields good quality measures 305. Numerous iris recognition processes achieve excellent performance. Thus, a nominal iris recognition approach 310 may be used for good quality iris to obtain a best match 160.

If the blur quality measure is high, indicating a blurry iris image, the recognition performance by a nominal iris recognition approach may be unreliable. Therefore, the iris recognition approach will not be processed. In the case of an extremely blurry image 315, other biometrics 320, such as a periocular skin texture model or holistic ocular appearance model may be used to recognize the individual.

If the blur quality measure falls within a blur distribution that is manageable as indicated at 325, then adaptive, multiband iris recognition 330 will be invoked. The multi-band recognition 330 matches the input iris with the targets in a gallery at similar spatial frequency as the blurry input iris.

Obscuration 335 or occlusion often occurs under several scenarios. Sometimes the eyelashes block part of the iris; sometimes the eye is not open wide and thus the upper and lower parts of the iris are not observable; sometimes the eye looks up or down, making the iris blocked by the eyelids.

When the occlusion is severe as indicated by the occlusion quality measure 335, the recognition engine 300 creates an occlusion or obscuration mask 340 that disables the matching of the occluded area. This avoids matching noisy and potentially erroneous iris pixels. Less severely occluded iris will be processed in the condition-based matching 140 and the multi-model matching 150 modules.

Similarly, in extreme gaze case 345, where the iris is moved to the far left or far right of the eye, a gaze mask 350 is created to ignore the uncertain areas for matching. The gazed image with masks is then warped and forwarded to the condition-based matching 140. Mild gaze 355 may be processed without masking through a warp model 360 to normalize the iris and may be treated in the condition based match 140 and the multi-model match 150. Condition-based matching 140 applies the proper fitting model, algorithm and parameters based on the condition as specified by which quality distribution the input quality measure falls into. For example, when a particular region of the iris has better quality than the other, a higher weighted score can be applied in matching this region and vice versa. The regional quality measures can be used to deduce a confidence in the matching results. This can lead to having a weighted mask, instead of a binary mask.

During the iris matching process, a fitting model derived from the segmented iris is used to match with that of the target. If the fitting model deviates slightly from the correct one, a significant mismatch will result. The fitting of the model is based on the extracted iris boundary and the estimated center of the iris, whose accuracy and precision are, in turn, affected by the quality of the iris. For example, some boundary pixel may be missing due to occlusion. The boundary of the iris may be inaccurate due to a blur iris. Thus, the match engine generates multiple fitting models guided by the iris quality measures.

Figure 4:
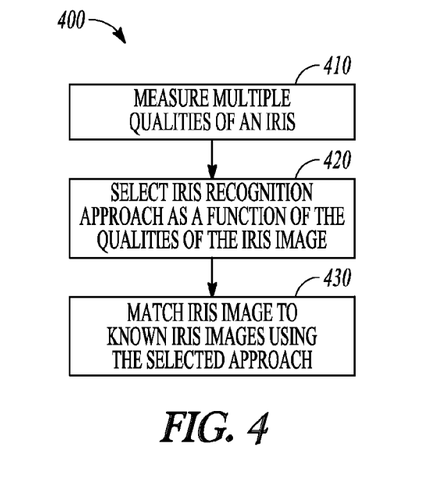
FIG. 4 is a flowchart illustrating a method of selecting an iris recognition approach according to an example embodiment.

In one embodiment, a method 400 in FIG. 4 includes measuring multiple qualities of an iris image 410. An iris recognition approach is selected at 420 as a function of the qualities of the iris image. The iris image is matched at 430 to a known iris image utilizing the selected approach.

Following further embodiments detail the condition-based matching 140 and multi-model matching 150 on different blur, occlusion and gaze conditions.

The effect of blur and lower resolution acquisition will lead to a loss of high frequency information of the iris image. The consequence is degraded recognition performance as an iris template with high fidelity high frequency information is matched to an iris template with low fidelity high frequency information. This is because typically, an iris template is encoded with a pre-selected, fixed Gabor filter. The selection of the filter dictates mainly the bandwidth and a center frequency.

Figure 5:
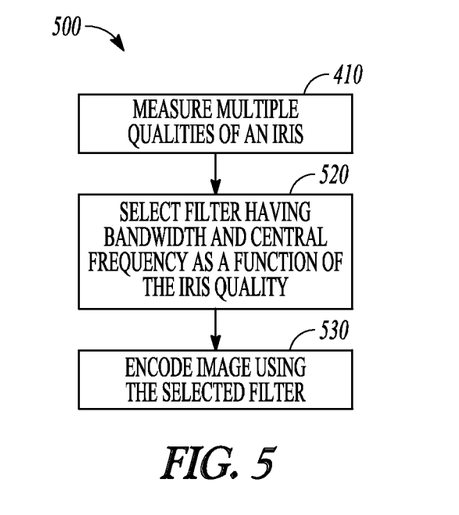
FIG. 5 is a flowchart illustrating a method of selecting a filter as a function of iris image quality according to an example embodiment.

As illustrated in the flowchart of FIG. 5 at 500, an assessment of the loss of high frequency or the reliability of the high frequency may be done with a blur quality metric in some embodiments. In some embodiments, Gabor parameters, such as center frequency and bandwidth may be selected based on a blur condition assessment done in 410. A filter (having a particular bandwidth and center frequency) is adaptively selected as a function of the evaluation 520. The iris image is encoded using the selected filter 530. The target and probe irises with similar spectral characteristics are used during matching in one embodiment for identification. The algorithm may be integrated in a standoff iris recognition system such as Honeywell's Combined Face and Iris Recognition System (CFAIRS).

In one embodiment, the probe and target irises may be encoded using multiple filters and the decision to use a specific spectral characteristic is done at the iris matching stage and depends on the quality parameters estimated earlier.

In one embodiment, the filter selection is done adaptively by evaluation of the spatial resolution of the segmented iris of both the target and the probe based on the iris size. This filter selection algorithm results in a high performance for standoff iris segmentation and reduces false alarms.

With low quality standoff iris recognition, there is an existing challenge to properly segment and model the iris under different scenarios like gaze and obscuration that leads a varying error of the outer boundary of the iris. Erroneous or partial segmentation will lead to a poor iris template and consequently a low performance of the iris recognition and will lead to an unacceptable performance of the iris biometrics.

Figure 6:
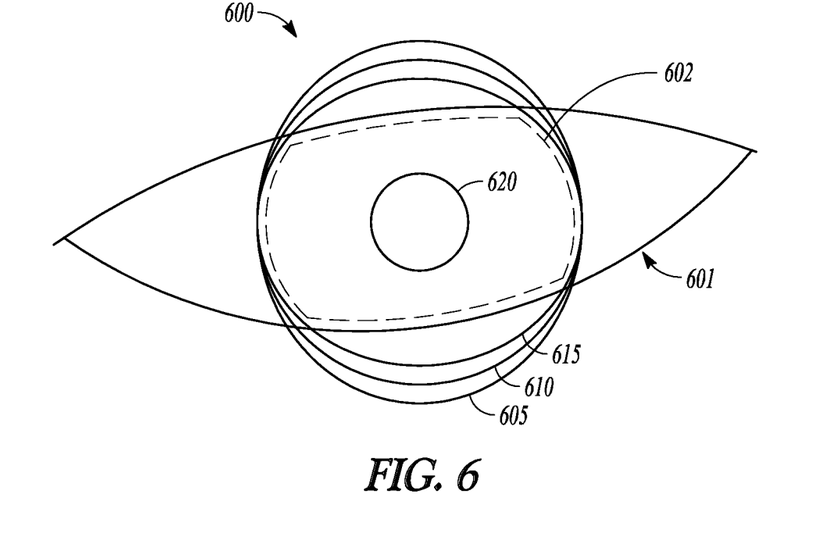
FIG. 6 is a block representation of multiple models of an iris according to an example embodiment.

FIG. 6 at 600 shows the generation of a multi-model iris. An eye image with eye 601 is segmented yielding a segmented iris outer boundary 602. Pupil boundary 620 is also segmented. Three different iris boundary models 605, 610, and 615, based on applying different segmentation strategies and model fitting to 602, will lead to different iris templates as the iris information is stretched or compressed based on the pupil and iris boundaries. Fitting criteria may be based on visible iris boundary points. These different hypotheses of the outer segmented boundary will lead to different models or iris templates.

In one embodiment, adaptive encoding of irises using a multi-model encoding is applied. Matching scores are combined or selected between the target templates and the testing iris image. Different models will indicate the most probable target iris templates of different people. The use of different models or iris templates may be integrated in standoff iris recognition where minimal cooperation is needed, and also can be used for forensic analysis of iris matching for low quality images.

Figure 7:
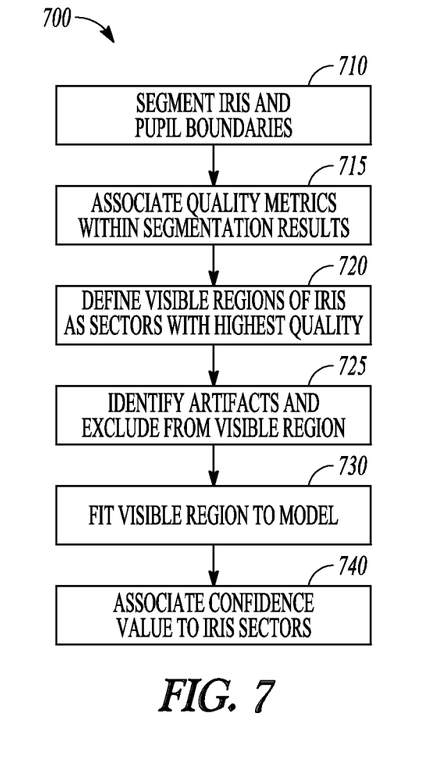
FIG. 7 is a flowchart illustrating iris segmentation and quality association with various sectors of the iris according to an example embodiment.

Details of the complete iris recognition approach are illustrated at 700 in FIG. 7. The first step in iris recognition involves segmentation of the pupil and iris boundaries at 710. Quality metrics are associated with the segmentation results at 715 and define a visible region of the iris as sectors with highest quality 720. The quality metrics considered include the smoothness of the pupil and iris sector boundaries, presence of sclera region along the boundary and area of the iris sector. Artifacts in the iris region, such as specular reflection, and shadows due to eyelids and eye lashes are identified and decrease the area of the visible region 725. In one embodiment, the association of quality metrics with segmentation holds good if the ratio of the area of the visible region to area of the whole iris region exceeds 40%. In one embodiment, only the visible region is fit with a model at 730, which provides a reasonable first order estimation of the border segment. The quality of iris matching is improved by associating a confidence value to the different iris sectors at 740 based on the artifacts, which include eye lashes and areas of low contrast.

In case the percentage of visible iris region falls below 40%, determining an appropriate boundary model of the iris is critical and using a proper model enhances the success of iris recognition. Due to the low confidence in choosing the exact iris outer boundary, multiple models can be fit using different sets of data points on the boundary as illustrated at 800 in FIG. 8. Using an inappropriate model implies that for the data that is rescaled, iris patterns will corrupt the iris code and the generated template, resulting in poor recognition rates. The error is observed to be very prominent if the visible region is much smaller than the obscured regions. A fitting model that provides the best matching bits within the limited set of models may be linearly adapted. The approach is to adaptively normalize the iris to adjust linearly the rubber sheet iris map at 810 to fit fewer identified models, to align the map at 820 to the varying edge points of the model while searching for the minimum possible matching distance.

Figure 8:
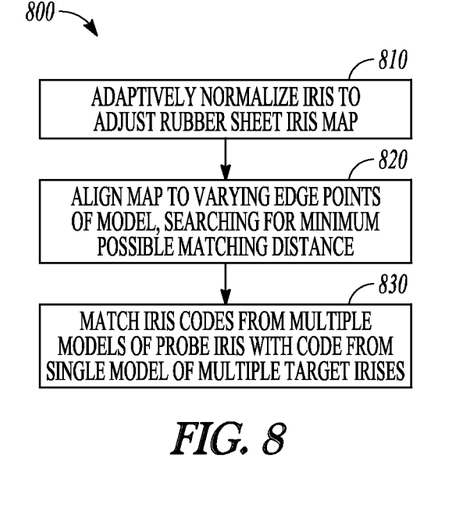
FIG. 8 is a flowchart illustrating adaptive normalization of an image of an iris according to an example embodiment.

The iris codes obtained from the multiple models of the probe iris are matched with codes, each of which is from a single model of multiple target irises at 830. In one embodiment, a two step criteria is followed. First, the best N possible matches for the probe iris are considered followed by identification of the target iris which has the maximum count of lowest intra class hamming distances among the N matches, as the best match.

In one embodiment, sub-iris quality measures computed in 410 are used to match irises with very low visible iris region. Regions of low confidence may be masked out so that the corresponding regions of the iris are not considered for matching.

Figure 9:
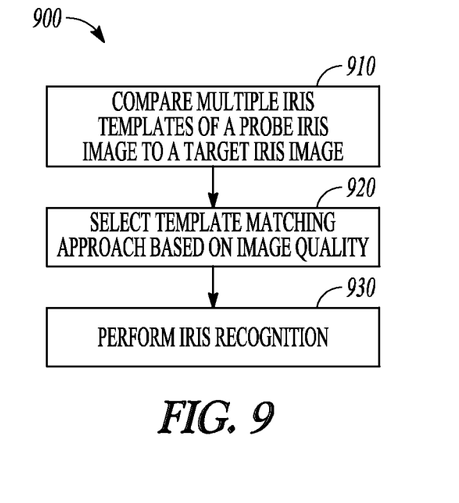
FIG. 9 is a flowchart illustrating template selection as a function of iris image quality according to an example embodiment.

In one embodiment as illustrated at method 900 in FIG. 9, multiple iris templates are compared to an iris image wherein iris information is stretched or compressed based on pupil and iris boundaries at 910. An iris template recognition approach is selected as a function of the qualities of the iris image at 920. The selected iris template is utilized to perform iris recognition at 930.

Gaze iris conditions also pose significant challenges to good iris recognition. Gaze iris can cause erroneous segmentation, and asymmetric, non-circular outer iris boundary. In one embodiment, robustness of iris recognition methodology is improved by detection of gaze in a non-cooperative iris as illustrated at 1000 in FIG. 10. Gazed irises are identified using the position of a pupil in an eye socket and its relationship to the eye corners, and shape of the pupil. Eye corners are detected at 1010 by fitting separate parabolas for points on the left and right segments of the eye socket boundary. Eyelid segments are adaptively chosen at 1015 based on the sclera region and the algorithm used in detection of the boundary. The shape of the pupil is analyzed at 1020 and an elliptical pupil usually depicts a gazed iris. Estimating the area inside the parabolas may be used in deciding to use an iris or ocular recognition procedure. Using the position of the pupil center, eye corners and pupil shape, the amount of gaze is estimated at 1025.

In one embodiment, eye corners may be detected by fitting separate curves for detected boundary points on the left and right segments of the eye socket. The eye corner is approximated as the vertex of the curve fit. In one embodiment, the segments are adaptively chosen based on the sclera region and POSE algorithm is used in detection of the boundary. The ratio of distances of the pupil to the eye corners provides an indication of eye gaze.

Figure 10:
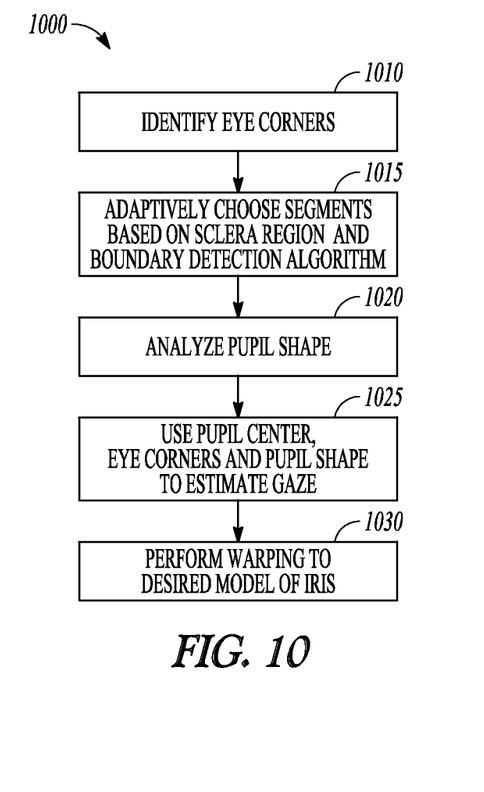
FIG. 10 is a flowchart illustrating gaze calculation and warping according to an example embodiment.

Gazed iris segmentation and mapping is also performed in some embodiments. Segmentation is challenging due to compression artifacts introduced in gazed irises and the obscurations from the eyelids. The iris pattern deformation is due to lateral pressure exerted on some iris tissues which warp a circular iris to an elliptical region. The pixels are remapped in a gazed iris to a circular iris before extracting the iris map. A warping projection function is computed at 1030 and used to transform the estimated boundary of the pupil to an ideal frontal pupil image. The inverse of this perspective projection is applied on both pupil and iris edges to estimate the warped region. The warped iris is used for iris map generation. Certain regions of a gazed iris may be masked based on the regional quality parameters of the iris.

In a further embodiment, to improve iris recognition performance, several of the above methods may be combined or used independently. In case an iris is blurred, adaptive filter selection improves the matching performance. In a case where the iris is occluded and the iris boundary has low confidence, better recognition results can be obtained by masking the region of low confidence, i.e. the region with eye lashes and shadows. Remapping the pixels in a gazed iris to a circular iris improves matching performance. Recognition results can be greatly improved by adaptive encoding of the irises, i.e. by using a multi-model hypothesis for the outer boundary.

In some embodiments, a recursive procedure is executed to estimate the correct pupil boundary in obscured irises. It is challenging to correctly estimate the boundary of a pupil obscured due to eye lashes or squinting of the eye. A multi-model analysis of the pupil boundary is performed and the error estimates involved in these models are used to choose the best fitting model. The iris boundary is estimated based on the pupil boundary. In case the iris quality measures fall below a certain threshold, the parameters of the pupil and iris segmentation are modified and they are re-segmented. The recursive procedure is done until the best iris quality parameters are achieved. The pupil boundary and the center of the pupil should be well identified, as a change leads to complete remapping of the iris map.

The above processes may be integrated in standoff iris recognition where minimal cooperation is needed, and also can be used for forensic analysis of iris matching for low quality images.

Figure 11:
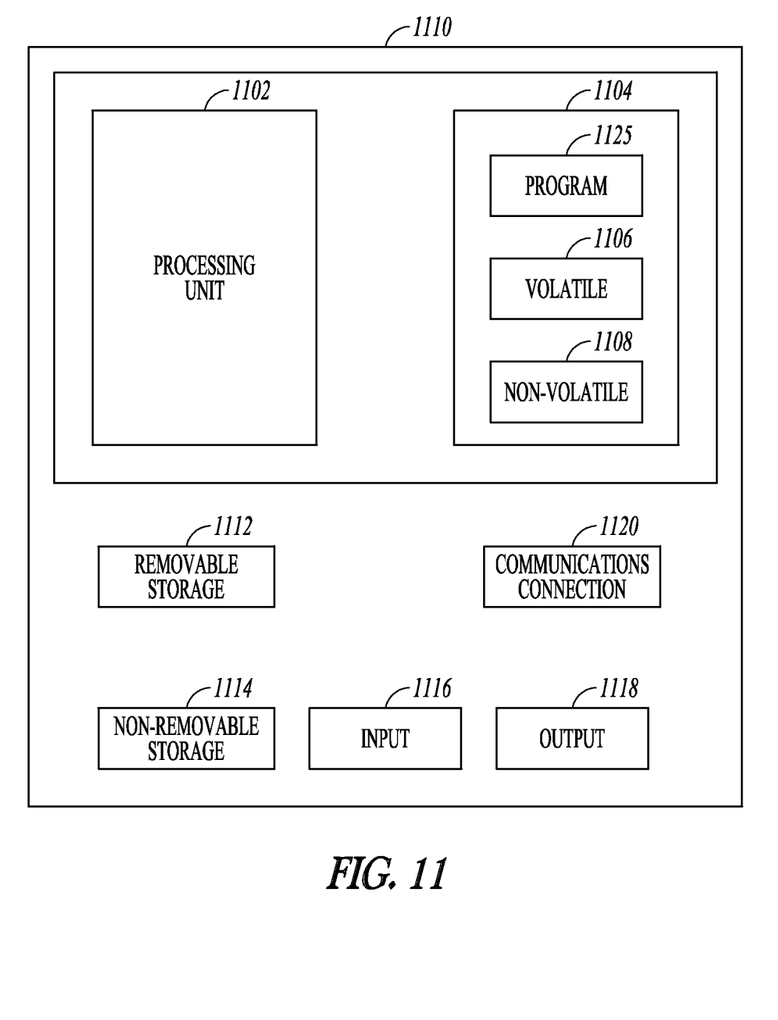
FIG. 11 is a block diagram of an example computer system for implementing methods according to an example embodiment.

A block diagram of a computer system that executes programming for performing the above algorithms is shown in FIG. 11 following the Abstract. A general computing device in the form of a computer 1110 may include a processing unit 1102, memory 1104, removable storage 1112, and non-removable storage 1114. Memory 1104 may include volatile memory 1106 and non-volatile memory 1108. Computer 1110 may include—or have access to a computing environment that includes—a variety of computer-readable media, such as volatile memory 1106 and non-volatile memory 1108, removable storage 1112 and non-removable storage 1114. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1110 may include or have access to a computing environment that includes input 1116, output 1118, and a communication connection 1120. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions to execute methods and algorithms described above may be stored on a computer-readable medium such as illustrated at a program storage device 1125 are executable by the processing unit 1102 of the computer 1110. A hard drive, CD-ROM, and RAM are some examples of articles including a computer-readable medium. Data, such as images, templates and other constructs used in the performance of the algorithms may be stored in any of the memory or storage devices and used by processing unit 1102 as needed. In further embodiments, networked storage, and multi-processor units may be used, as well as various forms of distributed or net centric computing resources.

In various embodiments, a condition based iris recognition method includes measuring, via a programmed computer, multiple qualities of a periocular image stored on a computer readable storage device, including an iris. An ocular recognition approach is selected by the programmed computer as a function of the qualities of the periocular images of a probe and a known target which is also stored on a computer readable storage device. The programmed computer is then used to matching the probe periocular image to the target image.

The programmed computer is used in one ocular recognition approach to perform a method that includes estimating gaze using a pupil model and estimated eye corners, and re-mapping pixels in a gazed iris image using the estimated amount of gaze to a frontal pupil image.

In a further embodiment, the programmed computer further calculates multiple fitting models of the iris boundary as a function of the qualities of the iris image, generates multiple templates from the models, and performs a multi-template matching of the probe and target iris.

The programmed computer may also select a filter having a center frequency and bandwidth as a function of iris blur quality, encode the iris image using the selected filter for matching purposes.

In still further embodiments, the programmed computer performs an ocular recognition approach that includes generating multiple iris templates wherein iris information is stretched or compressed based on a pupil and iris boundaries, selecting an iris template matching method as a function of the qualities of the iris image, and utilizing the selected iris templates to perform iris recognition.

The programmed computer also executes a method that includes estimating an iris obscuration measure as a function of area inside parabolas fit to upper and lower eyelids, and using the iris obscuration measure to decide whether to use an iris or ocular recognition procedure.

The programmed computer also executes a method that includes using a recursive pupil and iris segmentation procedure based on the iris quality parameters, performing pupil boundary segmentation by fitting multiple models based on a circular arc, wherein the iris segmentation and pupil segmentation are interdependent.

The invention claimed is:

1. A condition based iris recognition method comprising:
measuring multiple qualities of a periocular image, including an iris;
selecting an ocular recognition approach as a function of the qualities of the periocular images of a probe and a known target; and
matching the probe periocular image to the target image.

2. The method of claim 1 wherein the multiple qualities include ocular, periocular, iris and sub-iris (regional) qualities of the periocular image.

3. The method of claim 1 wherein the multiple quality measures include blur, obscuration, and gaze.

4. The method of claim 1 wherein matching produces an iris match score and a confidence score associated with the iris match score, based on iris quality measures.

5. The method of claim 1 wherein one ocular recognition approach includes matching specific sub-regions of an iris of a probe image and target image.

6. The method of claim 5 wherein sub-regions of an iris image having a higher quality are weighted more than sub-regions of an iris image having a lower quality.

7. The method of claim 1 wherein one ocular recognition approach comprises:
estimating gaze using a pupil model and estimated eye corners;
re-mapping pixels in a gazed iris image using the estimated amount of gaze to a frontal pupil image.

8. The method of claim 1 and further comprising:
calculating multiple fitting models of an iris boundary as a function of the qualities of the iris in the periocular image;
generating multiple templates from the models; and
performing a multi-template matching of the probe and known target.

9. The method of claim 1 wherein one ocular recognition approach uses wavelet based iris encoding comprising:
selecting a filter having a center frequency and bandwidth as a function of iris blur quality; and
encoding the iris in the periocular image using the selected filter for matching purposes.

10. The method of claim 9 wherein multiple filters with specific center frequencies and bandwidths are used to encode multiple iris templates of an iris image, and multiple matches are performed across the templates of probe and known target images encoded using the same filter parameters to obtain the best match score.

11. The method of claim 1 wherein one ocular recognition approach includes:
generating multiple iris templates wherein iris information is stretched or compressed based on a pupil and iris boundaries;
selecting an iris template matching method as a function of the qualities of the iris in the periocular image; and
utilizing the selected iris templates to perform iris recognition.

12. The method of claim 1 and further comprising:
estimating an iris obscuration measure as a function of area inside parabolas fit to upper and lower eyelids; and
using the iris obscuration measure to decide whether to use an iris or ocular recognition procedure.

13. The method of claim 1 and further comprising:
using a recursive pupil and iris segmentation procedure based on iris quality parameters;
performing pupil boundary segmentation by fitting multiple models based on a circular arc; and
wherein the iris segmentation and pupil segmentation are interdependent.

14. A computer readable storage device having instruction stored to cause a computer to perform a method of condition based iris recognition, the method comprising:
measuring multiple qualities of an periocular image, including the iris;
selecting an ocular recognition approach as a function of the qualities of the periocular images of a probe and a known target; and
matching the periocular probe image to the target image utilizing the selected approach.

15. The computer readable storage device of claim 14 wherein the instructions are integrated into at least one of an ASIC handheld device, digital signal processor, microprocessor, or other type of processor operating on a computer system.

16. The computer readable storage device of claim 14 wherein the method is performed by a SaaS (Software as a Service) where the processing occurs on a server cloud.

17. A condition based iris recognition system comprising:
a quality measuring module to measure multiple qualities of a periocular image, including an iris;
an ocular recognition approach selection module to select an ocular recognition approach as a function of the qualities of the periocular images of a probe and a known target; and
a matching module to match the probe periocular image to the target image.

18. The system of claim 17 wherein the multiple qualities include ocular, periocular, iris and sub-iris (regional) qualities of the periocular image.

19. The system of claim 17 wherein the multiple quality measures include blur, obscuration, and gaze.

20. The system of claim 17 wherein matching produces an iris match score and a confidence score associated with the iris match score, based on iris quality measures.

* * * * *